United States Patent
Shimamura et al.

(10) Patent No.: US 8,494,211 B2
(45) Date of Patent: Jul. 23, 2013

(54) HOUSE CHANGE JUDGMENT METHOD AND HOUSE CHANGE JUDGMENT PROGRAM

(75) Inventors: Hideki Shimamura, Tokyo (JP); Lin Zhu, Chiba (JP)

(73) Assignee: Pasco Corporation, Tokyo (JP)

( * ) Notice: Subject to any disclaimer, the term of this patent is extended or adjusted under 35 U.S.C. 154(b) by 563 days.

(21) Appl. No.: 12/734,166

(22) PCT Filed: Oct. 20, 2008

(86) PCT No.: PCT/JP2008/068984
§ 371 (c)(1),
(2), (4) Date: Apr. 15, 2010

(87) PCT Pub. No.: WO2009/051258
PCT Pub. Date: Apr. 23, 2009

(65) Prior Publication Data
US 2010/0208982 A1    Aug. 19, 2010

(30) Foreign Application Priority Data
Oct. 19, 2007   (JP) .................... 2007-272000

(51) Int. Cl.
*G06K 9/00*    (2006.01)
(52) U.S. Cl.
USPC ............. 382/100; 382/154; 382/170
(58) Field of Classification Search
USPC ........................ 382/100, 154, 170
See application file for complete search history.

(56) References Cited

U.S. PATENT DOCUMENTS

| 5,265,173 A * | 11/1993 | Griffin et al. ............... 382/103 |
| 7,191,066 B1 * | 3/2007 | Rahmes et al. ................. 702/5 |
| 2007/0025595 A1 | 2/2007 | Koizumi et al. |
| 2009/0136090 A1 | 5/2009 | Ozawa |

FOREIGN PATENT DOCUMENTS

| JP | A-2004-117245 | 4/2004 |
| JP | A-2004-198530 | 7/2004 |
| JP | A-2005-241886 | 9/2005 |
| JP | A-2007-3244 | 1/2007 |
| JP | A-2007-34808 | 2/2007 |

OTHER PUBLICATIONS

International Search Report issued in International Application No. PCT/JP2008/068984 on Jan. 20, 2009.

* cited by examiner

*Primary Examiner* — Jon Chang
(74) *Attorney, Agent, or Firm* — Oliff & Berridge, PLC (57) ABSTRACT

It is an object to improve the accuracy of a house change judgment based on images and the like acquired by an airplane. A terrain altitude is subtracted from an attitude value of a digital surface model (DSM) acquired from an airplane or the like to generate a normalized DSM (NDSM). A judgment target region is segmented into a plurality of regions of elevated part for each elevated part with a size corresponding to a house appearing on the NDSM. An outline of the house is extracted from each region of elevated part and a house object containing three-dimensional information on the house is defined by the outline and NDSM data within the outline. The house objects acquired at two different time points, respectively, are compared to detect a variation between the two different time points, and a judgment as to a house change is made based on the variation.

16 Claims, 6 Drawing Sheets

HOUSE CHANGE JUDGMENT METHOD AND HOUSE CHANGE JUDGMENT PROGRAM

TECHNICAL FIELD

The present invention relates to a house change judgment method and a house change judgment program.

BACKGROUND ART

The below-mentioned patent documents propose using aerial surveying technology to make a judgment or the like as to whether or not a fixed asset has been changed. Conventionally, there has been proposed a method in which a high-resolution image or digital surface model (DSM) data is acquired from an aircraft or the like at two different time points, and those pieces of data of the two time points are compared to each other for each pixel, to thereby judge whether or not a house has been changed between the two time points.

Specifically, in house change judgment which uses an image photographed from an aircraft or the like, registration is performed between a previously-acquired image and a newly-acquired image to obtain a difference in pixel data, such as brightness value, between the old and new images with regard to pixels at the corresponding positions, and the difference is compared to a predetermined threshold, to thereby judge whether or not there is a variation. Then, based on a group of pixels with variation, a region with variation of the image is extracted, and it is judged whether the house change is disappearance of or new construction of a house, for example.

Further, in house change judgment which uses a DSM, for example, a plurality of aerial images taken from different flight points are matched to one another, and based on differences in how the same feature looks among the plurality of aerial images, the height of the feature is obtained, to thereby generate a DSM. Then, in the same manner as in the above-mentioned comparison between the old and new images, the old and new pieces of DSM data are compared to each other for each pixel to extract a region with variation of the DSM, and then, based on the region with variation, a judgment is made as to the house change.

Patent Document 1: JP 2004-117245 A
Patent Document 2: JP 2007-3244 A

DISCLOSURE OF THE INVENTION

Problems to be Solved by the Invention

In analysis processing performed on a pixel basis, it is difficult to appropriately set a threshold due to influences from data noise, misregistration, and the like. Accordingly, there is a problem that variation detection failure and erroneous detection are more likely to occur. In particular, in the case of comparison made between high-resolution images, it is difficult to perform the registration with high accuracy, and hence there is a problem that variation detection of high accuracy is difficult to perform.

Further, it is not easy to put together judgment results about the presence or absence of variation, which are obtained on a pixel basis, into a unit of a house. For example, even if analysis performed on a mesh basis, or auxiliary data such as a house polygon is used, it is not easy to perform change judgment on a house basis in consideration of extension or reconstruction of a house, and the like. Further, in the case of house rehabilitation or the like, a variation in image data or the like is small, and hence it is difficult to extract a region with variation. Accordingly, there is a problem that the change judgment is difficult to perform.

Means for Solving the Problems

A house change judgment method according to the present invention includes: a region-of-elevated-part extraction step of determining, based on altitude data on an above-ground surface including a feature, for each elevated part of the above-ground surface, a region of elevated part which contains each elevated part, the altitude data being acquired from above with regard to each point within a judgment target region, each elevated part having a size corresponding to a house to be a judgment target; an outline extraction step of extracting an outline of the house from the region of elevated part based on the altitude data; an object defining step of defining a house object containing three-dimensional information on the house based on the extracted outline and the altitude data within the outline; and a change judgment step of comparing the house objects acquired at two different time points to detect a variation between the two different time points, and making a judgment as to a house change based on the variation.

The region-of-elevated-part extraction step may include a normalization processing step of subtracting, from an altitude of the above-ground surface, an altitude of a ground surface excluding the feature to generate height data on the feature, and the region-of-elevated-part extraction step may include determining the region of elevated part based on the height data on the feature.

In a preferred aspect of the present invention, the region-of-elevated-part extraction step may include obtaining the region of elevated part through region segmentation using a watershed method.

Also, in a preferred aspect of the present invention, the change judgment step may include: an area comparing step of calculating areas of the house objects based on the outlines to judge whether or not the areas of the house objects which are comparison targets are the same; an outline comparing step of judging whether or not the outlines of the house objects which are the comparison targets are the same; an average height comparing step of calculating average heights of the house objects based on the three-dimensional information to judge whether or not the average heights of the house objects which are the comparison targets are the same; a height histogram comparing step of obtaining height histograms of the house objects based on the three-dimensional information to judge whether or not the height histograms of the house objects which are the comparison targets are the same; and a judgment step of judging that there is no house change in a case where it is judged that there is no difference between the two different time points in all of the comparing steps, and, on the other hand, judging that there is a house change in a case where it is judged that there is a difference in any one of the comparing steps.

A house change judgment program according to the present invention causes a computer to execute: a region-of-elevated-part extraction procedure of determining, based on altitude data on an above-ground surface including a feature, for each elevated part of the above-ground surface, a region of elevated part which contains each elevated part, the altitude data being acquired from above with regard to each point within a judgment target region, each elevated part having a size corresponding to a house to be a judgment target; an outline extraction procedure of extracting an outline of the house from the region of elevated part based on the altitude data; an object defining procedure of defining a house object containing three-dimensional information on the house based on the extracted outline and the altitude data within the outline; and a change judgment procedure of comparing the house objects acquired at two different time points to detect a variation between the two different time points, and making a judgment as to a house change based on the variation.

The region-of-elevated-part extraction procedure may include a normalization processing procedure of subtracting, from an altitude of the above-ground surface, an altitude of a ground surface excluding the feature to generate height data on the feature, and the region-of-elevated-part extraction procedure may include determining the region of elevated part based on the height data on the feature.

In a preferred aspect of the present invention, the region-of-elevated-part extraction procedure may include obtaining the region of elevated part through region segmentation using a watershed method.

Also, in a preferred aspect of the present invention, the change judgment procedure may include: an area comparing procedure of calculating areas of the house objects based on the outlines to judge whether or not the areas of the house objects which are comparison targets are the same; an outline comparing procedure of judging whether or not the outlines of the house objects which are the comparison targets are the same; an average height comparing procedure of calculating average heights of the house objects based on the three-dimensional information to judge whether or not the average heights of the house objects which are the comparison targets are the same; a height histogram comparing procedure of obtaining height histograms of the house objects based on the three-dimensional information to judge whether or not the height histograms of the house objects which are the comparison targets are the same; and a judgment procedure of judging that the there is no house change in a case where it is judged that there is no difference between the two different time points in all of the comparing procedures, and, on the other hand, judging that there is a house change in a case where it is judged that there is a difference in any one of the comparing procedures.

EFFECT OF THE INVENTION

According to the present invention, house objects corresponding to individual houses are extracted based on a relief which appears in a DSM, and comparison is made on a house object basis between two time points. Therefore, it is easy to make a judgment as to a house change, and also, accuracy thereof improves. Further, in addition to information on a region in which the house is located, the house object contains height information acquired based on the DSM, which enables three-dimensional recognition of the house. Therefore, it is possible to detect such a change as house rehabilitation, which has been conventionally difficult to discriminate, with high accuracy.

BEST MODE FOR CARRYING OUT THE INVENTION

Hereinafter, description is given of a mode for carrying out the present invention (hereinafter, referred to as embodiment) with reference to the drawings.

Figure 1:
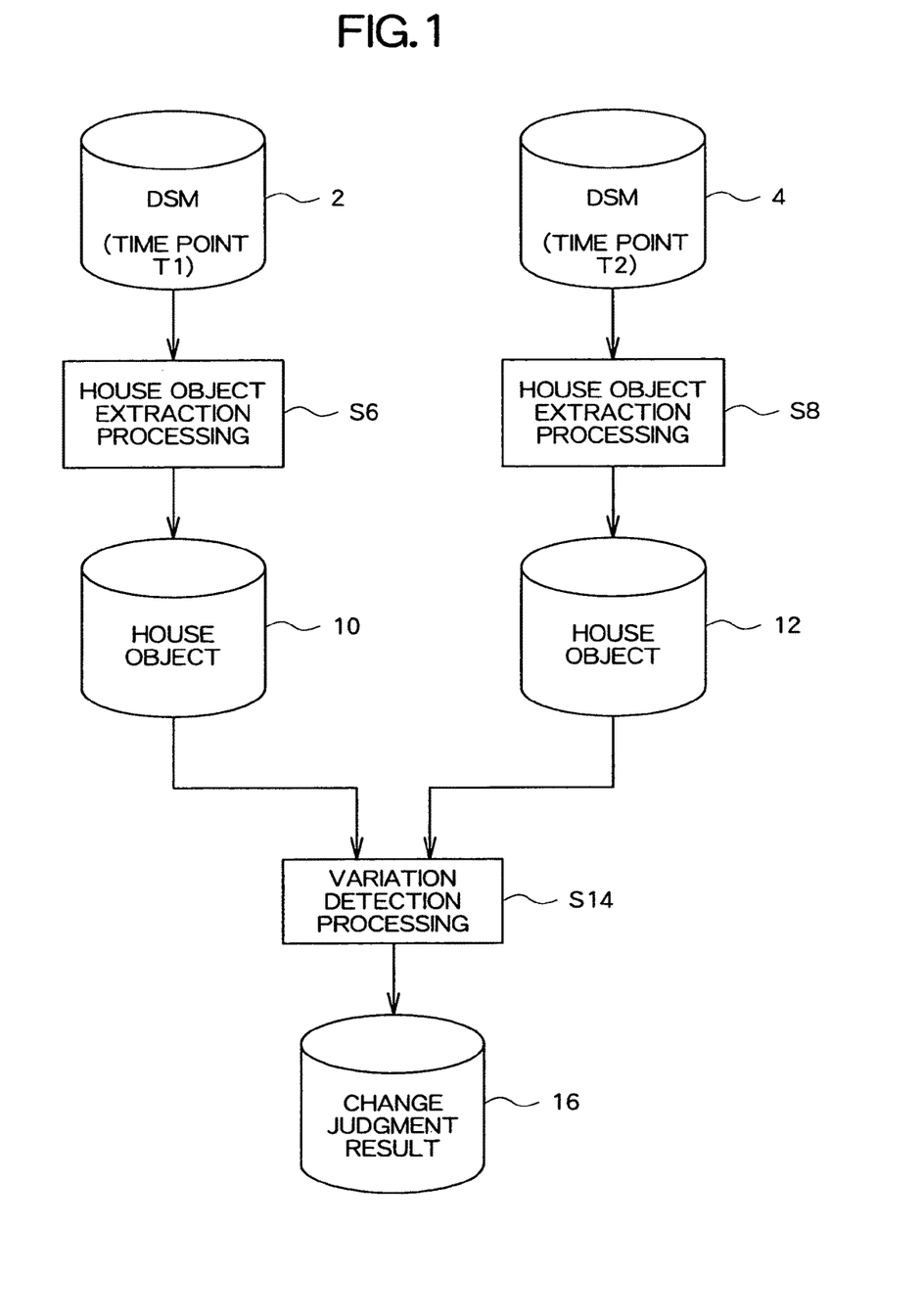
FIG. 1 is a flowchart illustrating a general flow of processing of a house change judgment method according to an embodiment of the present invention.

FIG. 1 is a flowchart illustrating a general flow of processing of a house change judgment method according to the embodiment. Digital surface model (DSM) data files 2 and 4 acquired with regard to a judgment target region at different time points T1 and T2 are subjected to house object extraction processing S6 and S8, respectively. In the house object extraction processing S6 and S8, based on relief of an above-ground surface which is represented by a DSM, regions of elevated part each containing an elevated part corresponding to a house are determined, an outline of the house is extracted from each of the regions of elevated part, and a house object containing information on the outline and the height of each point within the outline is defined. Extraction results of the house object which are acquired with regard to the time points T1 and T2 are stored in house object files 10 and 12, respectively. Variation detection processing S14 is performed with respect to the respective pieces of information on the house object of the time points T1 and T2. In the variation detection processing S14, matching and comparison are performed between the house object of the time point T1 and the house object of the time point T2 to detect a variation in house object between the two time points, and then, a result thus obtained is output as a change judgment result file 16.

Here, in a case where the house object extraction processing has already been performed and a house object file already exists, this house object file is used in the variation detection processing S14, and the house object extraction processing may be omitted.

Figure 2:
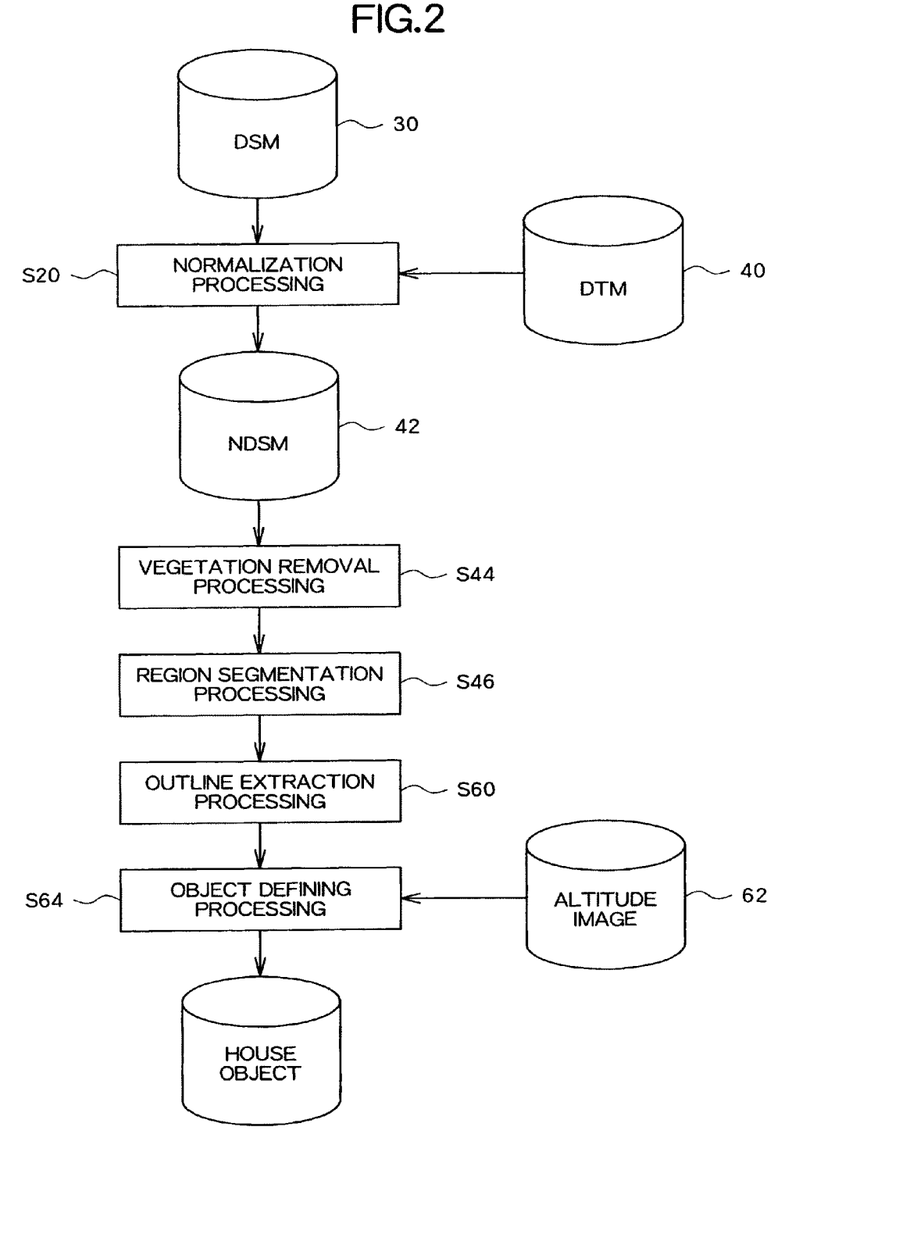
FIG. 2 is a general flow chart of a house object extraction processing.
Figure 3:
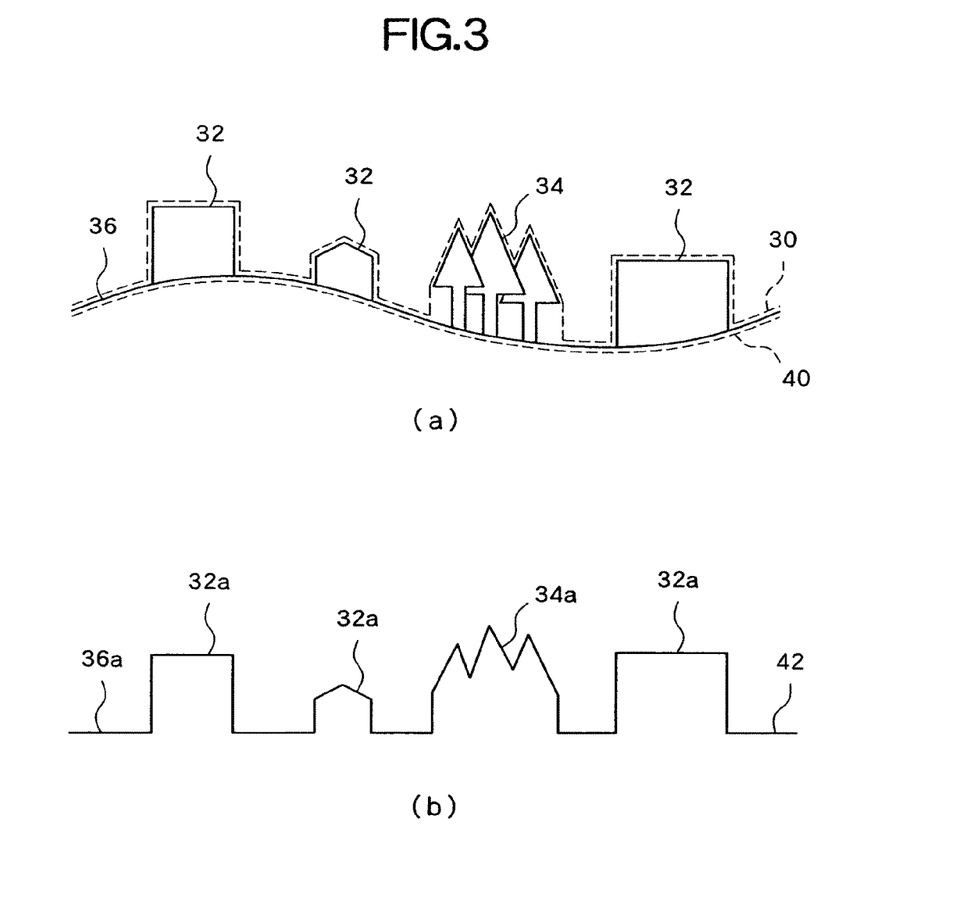
FIG. 3 is Schematic diagrams illustrating normalization processing performed with respect to a DSM.

FIG. 2 is a general flow chart of the house object extraction processing S6 and S8. The DSM is input to be subjected to normalization processing S20, and in the normalization processing S20, normalization processing for removing an influence of a digital terrain model (DTM) contained in the DSM is performed. FIG. 3 are schematic diagrams illustrating the normalization processing. FIG. 3(a) is a schematic vertical cross section of above-ground features. A DSM 30 represents the horizontal coordinates/altitudes of surfaces of such features as houses 32 and trees 34, and the horizontal coordinates/altitudes of a ground surface 36 which is exposed between the features. Here, the altitude of a house in the DSM 30 is the sum of the altitude of the ground surface below the house and the height of the house. The normalization processing S20 is processing in which a value of a digital terrain model (DTM) 40 is subtracted from a value of the DSM 30, to thereby generate a normalized digital surface model (NDSM). FIG. 3(b) is a vertical cross section schematically illustrating an NDSM 42 obtained in association with the above-ground features of FIG. 3(a). In the NDSM 42, the features (houses 32a and trees 34a) have height information from the ground surface, whereas a ground surface 36a basically has a height corresponding to a height of 0. For example, as the DTM 40, a model estimated from the DSM through various types of filtering processing, such as morphological filtering processing, may be used. Alternatively, an existing DTM regarding the judgment target region may be used.

In the NDSM, a feature other than the house has a significant height, in particular, vegetation such as the trees 34a may have a height equivalent to the height of the house, and hence the vegetation becomes a noise factor in judgment of the house. Vegetation removal processing S44 is processing for removing a portion related to the vegetation from the NDSM 42, in which a region of the vegetation is discriminated, and masking is performed by, for example, overwriting NDSM data on that region with 0. A roof or rooftop of a house has a flat surface over a relatively long horizontal distance. On the other hand, in the vegetation region, height fluctuations occur with a relatively small spatial periodicity. For example, this difference is used to discriminate the vegetation region, and the vegetation region may be removed from the NDSM 42. Specifically, a region in which a variance of a gradient between adjacent points of the NDSM data exceeds a predetermined threshold is determined as the vegetation region. Further, discrimination may be made based on a texture caused by height fluctuations in an image photographed from an aircraft or the like. Further, a multispectral image may also be used to detect the vegetation region because tree leaves have the property of reflecting near-infrared light with a high intensity. For example, a region in which a normalized difference vegetation index (NDVI) is equal to or higher than a predetermined threshold may be judged to be the vegetation region. The NDVI is calculated by the following equation:

$$NDVI=(D_{IR}-D_R)/(D_{IR}+D_R)$$

where $D_R$ represents a pixel value of a red (R) component, and $D_{IR}$ represents a pixel value of a near-infrared (IR) component.

Figure 4:
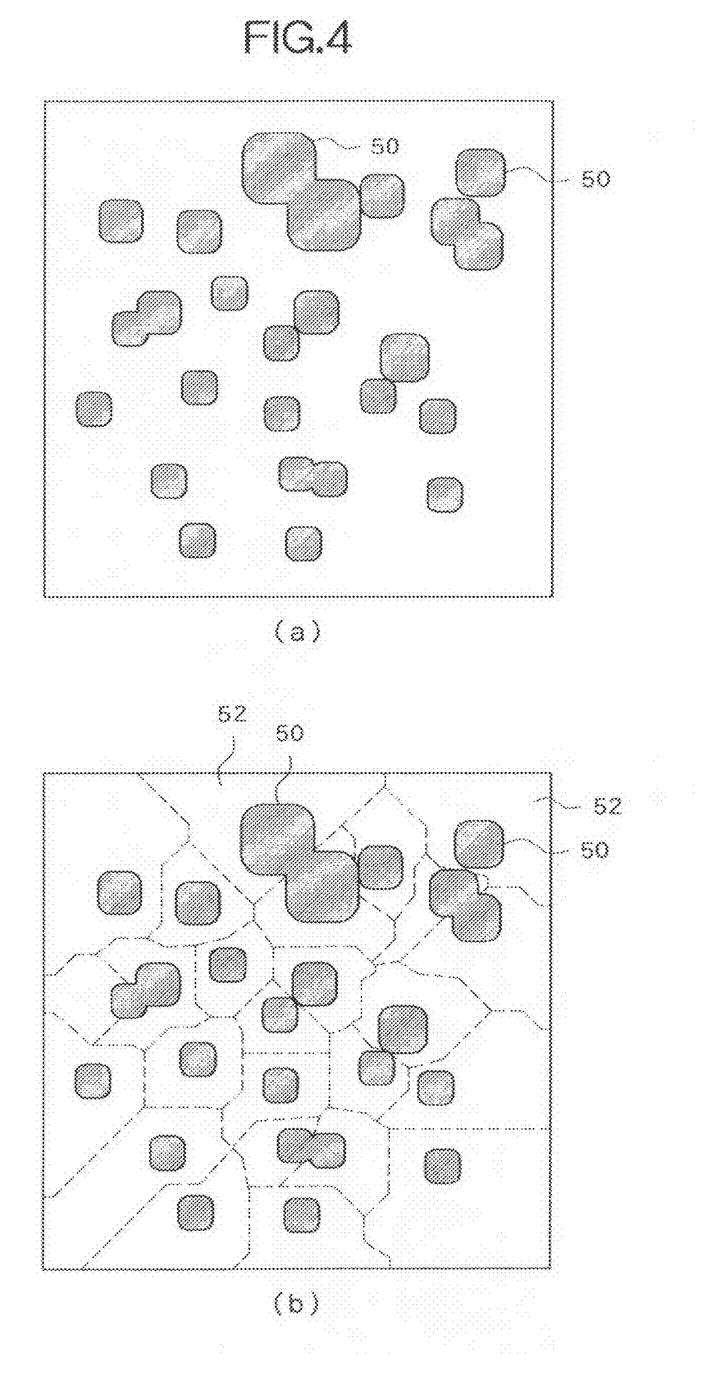
FIG. 4 is Schematic plan views illustrating a region segmentation processing.

Next, the judgment target region represented by the NDSM which has been subjected to the vegetation removal is segmented into regions of an elevated part, each of which contains one elevated part recognized in the NDSM (region segmentation processing S46). In the above-mentioned conversion processing from the DSM to the NDSM, a ground surface's irregularity having a larger scale than the house is essentially removed, and an elevated part having a size corresponding to the house is left intact. Accordingly, the region of elevated part may be set for each house 32a. FIG. 4 are schematic plan views illustrating the region segmentation processing. FIG. 4(a) is a view obtained by binarizing, for the sake of convenience, the irregularity of the NDSM of the judgment target region after the vegetation removal processing S44. In FIG. 4(a), shaded regions 50 correspond to the positions of the elevated parts. In the region segmentation processing S46, the judgment target region is segmented into a plurality of regions of elevated part 52 so that the elevated parts are separated from one another. As a method for this region segmentation, for example, the watershed method may be used.

With respect to the regions of elevated part 52 which have been extracted through the normalization processing S20, the vegetation removal processing S44, and the region segmentation processing S46 as described above, outline extraction processing S60 for extracting the outline of the house is performed. In the outline extraction processing, a group of points which may constitute edges are extracted based on, for example, a variation in an image (altitude image) 62 acquired from the aircraft or the like, in which the altitude of the above-ground surface is represented by brightness or colors. Note that instead of the altitude image, the outline extraction may also be performed by using an image of the above-ground surface which is photographed from the aircraft or the like. The edge extraction may be performed by using various types of edge filter. With respect to the group of points constituting the edges, processing for extracting line segments and generating an image of line segments is performed. For example, by performing tracking and filtering for the segmentation processing, the group of points is divided into sets of points which may be grouped into one unit. In addition, points which do not constitute one sufficiently-large group, and therefore may be recognized to be noise, are removed. Next, the line segments are extracted through, for example, the Hough transform. Next, processing for extracting the outline of the house from the image of line segments is performed. For example, technology of perceptual grouping is applied to the image of line segments so as to extract the outline of the house.

For each outline thus extracted, the house object is defined (object defining processing S64). The house object is associated with information on the outline and the NDSM data within the outline.

The processing described above with reference to FIG. 2 or the like is performed with respect to the DSMs of the time points T1 and T2 as the house object extraction processings S6 and S8 illustrated in FIG. 1, respectively. Then, with respect to the pieces of information on the house objects of the time points T1 and T2, respectively, the variation detection processing S14 is performed.

Figure 5:
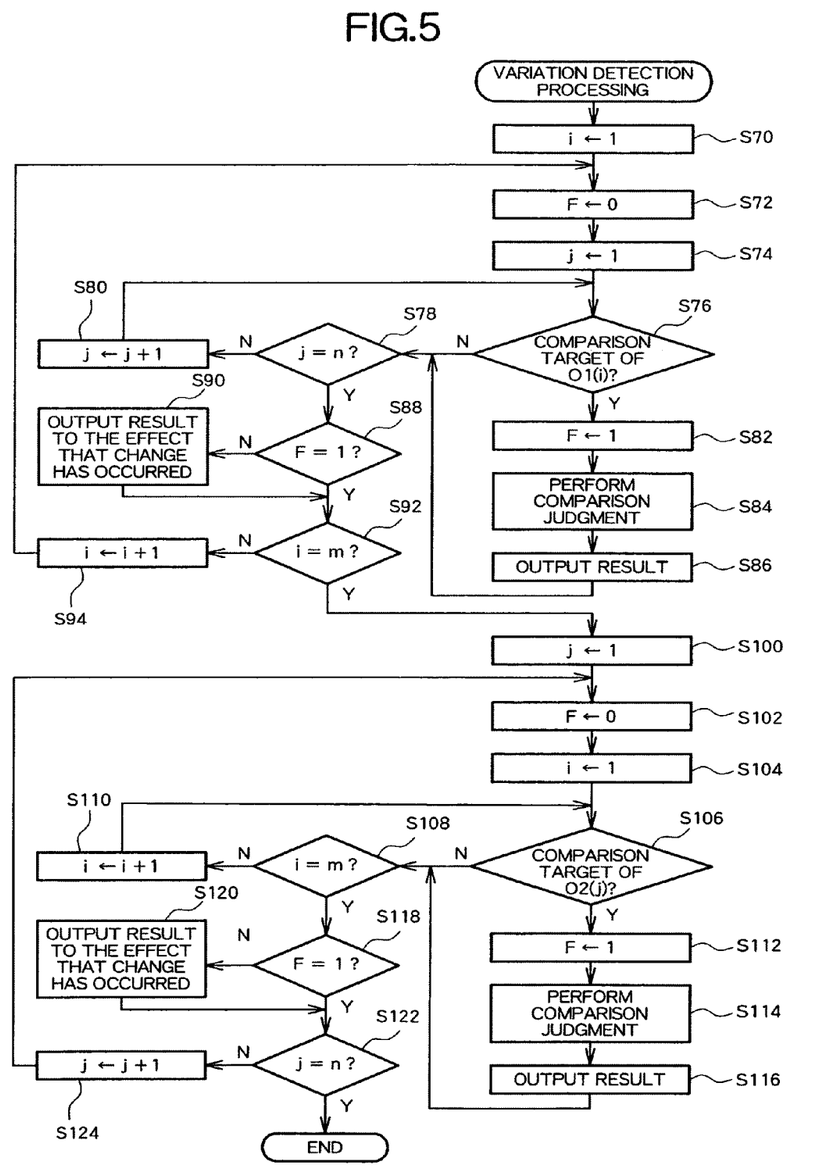
FIG. 5 is a flowchart illustrating an overview of a variation detection processing.

FIG. 5 is a flow chart illustrating an overview of the variation detection processing S14. The number of house objects extracted from the judgment target region at the time point T1 is represented by m, and those house objects are represented by O1(i) (1≦i≦m), whereas the number of house objects extracted from the judgment target region at the time point T2 is represented by n, and those house objects are represented by O2(j) (1≦j≦n).

For example, first, with regard to an arbitrary house object O1(i) of the time point T1 preceding the time point T2, a house object O2(j) which is to be a comparison target is searched for (Steps S72 to S80). Here, a house object O2(j) which is essentially located at the same position as the house object O1(i) is regarded as the comparison target. If there is a house object O2(j) to be the comparison target ("Y" in S76), a flag F indicating whether or not the comparison target has been detected is set to 1 (S82), a judgment is made through comparison with the house object O2(j) (S84), and a result thus obtained is output to the judgment result file and recorded therein (S86). In a case where there is no comparison target found in all the house objects O2(j) through the search (flag F=0 in S88), a change judgment result is recorded in the judgment result file to the effect that no house exists which corresponds to the house object O1(i) at the time point T2, that is, the house which corresponds to the house object O1(i) has disappeared (S90).

This comparison judgment is performed for all the house objects O1(i) (S92 and S94), and after that, conversely, the comparison judgment is performed with regard to the house objects O2(j) in the same manner as described above for the house objects O1(i). Specifically, first, the house objects O2(j) are selected one by one (S100 and S124), and then, a house object O1(i) which is to be the comparison target of the house object O2(j) is searched for (Steps S102 to S110). If there is a house object O1(i) located at the same position as the house object O2(j) ("Y" in S106), the comparison judgment is performed (S114 and S116). On the other hand, in a case where there is no house object O1(i) to be the comparison target (flag F=0 in S118), a change judgment result is recorded in the judgment result file to the effect that no house corresponding to the house object O2(j) existed at the time point T1, that is, the house object O2(j) is a newly-constructed house or the like (S120). Note that here, the comparison judgment processing S114 and the comparison judgment processing S84 may be regarded as essentially the same processing. In this case, with regard to a combination of the house objects O1(i) and O2(j) which are the comparison targets, the two comparison judgment processings S84 and S114 are repetitive. Accordingly, for example, there may be provided a configuration in which specific processing is omitted in the comparison judgment processing S114, and in the processing S116 for performing output to the judgment result file, the corresponding judgment result obtained in the comparison judgment processing S84 is duplicated when necessary as a judgment result for the corresponding house object O2(j).

Figure 6:
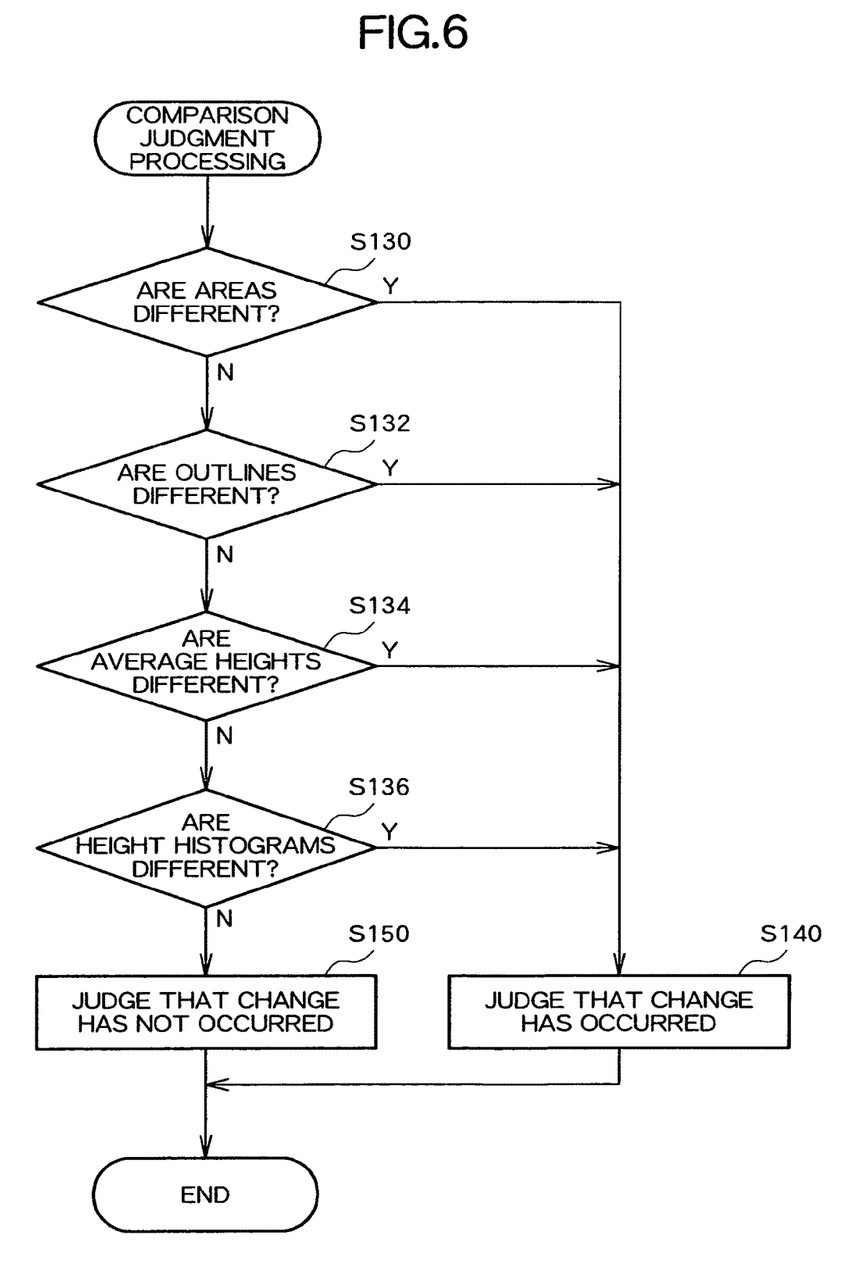
FIG. 6 is a flow chart illustrating an example of a comparison judgment processing.

FIG. 6 is a flowchart illustrating an example of the comparison judgment processings S84 and S114, in which it is judged whether or not there is a change over the two time points between a pair of house objects O1 and O2, which are the comparison targets selected from among the house objects of the time points T1 and T2, respectively.

First, based on the information on the outline of the house object, the areas of the respective house objects O1 and O2 are calculated, and compared to each other in terms of size (S130). If there exists a significant difference between the areas of both the house objects, it is judged that a change has occurred between the houses represented by the respective objects (S140).

In a case where there is no difference in area, a matching degree between the outlines of the house objects O1 and O2 is calculated. If the matching degree is lower than a predetermined reference value (S132), it is judged that a change has occurred (S140).

In a case where the matching degree between the outlines is equal to or larger than the reference value, a comparison is made with regard to the height of the house based on the values of the NDSM within the outline. As this comparison of the height information, for example, average heights are first calculated for the respective house objects O1 and O2, and then, the average heights are compared to each other (S134). If there exists a significant difference in average height of both the house objects, it is judged that a change has occurred (S140).

In a case where there is no difference in average height, a further detailed comparison is made with respect to the NDSM data of a plurality of points within the respective outlines of the house objects O1 and O2. For example, histograms regarding the height (NDSM data) are obtained for the respective house objects O1 and O2, and if a degree of similarity between them is lower than a predetermined reference value (S136), it is judged that a change has occurred (S140). In addition to that, whether or not a change has occurred may be judged using, as an indicator, the sum of squares of a height difference ($\Delta$) between the house objects O1 and O2 with regard to each point within the outline, the number of pixels in which the absolute value of $\Delta$ exceeds a predetermined threshold, or the like.

In a case where there is no difference found between the house objects O1 and O2 under any one of various types of judgment criterion described above, it is judged that there is no change between the house objects (S150).

Note that in the comparison judgment processing illustrated in FIG. 6, the main purpose is to detect whether or not a change has occurred, and hence, if a difference is detected under a judgment criterion in midstream, a judgment is omitted with regard to the following judgment criteria. On the other hand, there may also be provided a configuration in which a judgment is made under each of all the judgment criteria to make a comprehensive determination as to whether or not a change has occurred based on judgment results thereof, and those judgment results are also recorded in the judgment result file. Further, based on the judgment results from a plurality of judgment criteria, the type of the change may be discriminated and recorded in the judgment result file. For example, to give the types of the change, in addition to simple disappearance/new construction of a house, a discrimination may be made based on the height information contained in the house object among house rehabilitation at the same location, extension of a house in which the second floor is added to the entirety of or a part of a one-story house, and reduction of a house, conversely.

The above-mentioned house change judgment method may be implemented as a program to be executed on a computer. Through the execution of the program, the computer executes the house object extraction processing S6 and S8 with respect to the DSM data files 2 and 4 acquired from the aircraft or the like, generates the house object files 10 and 12, executes the variation detection processing S14 with respect to the house objects of the two time points which are stored in the house object files 10 and 12, and generates the change judgment result file 16.

Further, in the above-mentioned embodiment, description has been given of an aspect in which an image photographed from the aircraft and the DSM generated from the image are used, but an image and a DSM acquired from a high-resolution satellite may be used. Further, the DSM may be acquired by irradiating the above-ground features with a laser beam from the aircraft or the like.

Industrial Applicability

Information on the house change which is acquired through application of the house change judgment method and the house change judgment program according to the present invention serves as useful information in evaluation of a fixed asset tax, identification of a disaster-stricken place, and the like.

The invention claimed is:

1. A house change judgment method, comprising:
a region-of-elevated-part extraction step of determining, based on altitude data on an above-ground surface including a feature, for each elevated part of the above-ground surface, a region of elevated part which contains each elevated part, the altitude data being acquired from above with regard to each point within a judgment target region, each elevated part having a size corresponding to a house to be a judgment target;
an outline extraction step of extracting an outline of the house from the region of elevated part based on the altitude data;
an object defining step of defining a house object containing three-dimensional information on the house based on the extracted outline and the altitude data within the outline; and
a change judgment step of comparing a first object acquired at a first time point with a second object acquired at a second time point to detect a variation between the first object and the second object acquired at the two different time points, and making a judgment as to a house change based on the variation,
wherein at least one of the first object and the second object is the house object.

2. The house change judgment method according to claim 1, wherein:
the region-of-elevated-part extraction step comprises a normalization processing step of subtracting, from an altitude of the above-ground surface, an altitude of a ground surface excluding the feature to generate height data on the feature; and the region-of-elevated-part extraction step comprises determining the region of elevated part based on the height data on the feature.

3. The house change judgment method according to claim 1, wherein the region-of-elevated-part extraction step comprises obtaining the region of elevated part through region segmentation using a watershed method.

4. The house change judgment method according to claim 1, wherein the first object is a first house object and the second object is a second house object and the change judgment step comprises:
   an area comparing step of calculating areas of the first house object and the second house object based on the outline of each of the first house object and the second house object to judge whether or not the areas of the first house object and the second house object which are comparison targets are the same;
   an outline comparing step of judging whether or not the outline of each of the first house object and the second house object which are the comparison targets are the same;
   an average height comparing step of calculating average heights of the first house object and the second house object based on the three-dimensional information to judge whether or not the average heights of the first house object and the second house object which are the comparison targets are the same;
   a height histogram comparing step of obtaining height histograms of the first house object and the second house object based on the three-dimensional information to judge whether or not the height histograms of the first house object and the second house object which are the comparison targets are the same; and
   a judgment step of judging that there is no house change in a case where it is judged that there is no difference between the first house object and the second house object acquired at the two different time points in each of all the comparing steps, and, on the other hand, judging that there is a house change in a case where it is judged that there is a difference in any one of the comparing steps.

5. A non-transitory computer readable medium storing a house change judgment program for causing a computer to execute:
   a region-of-elevated-part extraction procedure of determining, based on altitude data on an above-ground surface including a feature, for each elevated part of the above-ground surface, a region of elevated part which contains each elevated part, the altitude data being acquired from above with regard to each point within a judgment target region, each elevated part having a size corresponding to a house to be a judgment target;
   an outline extraction procedure of extracting an outline of the house from the region of elevated part based on the altitude data;
   an object defining procedure of defining a house object containing three-dimensional information on the house based on the extracted outline and the altitude data within the outline; and
   a change judgment procedure of comparing a first object acquired at a first time point with a second object acquired at a second time point to detect a variation between the first object and the second object acquired at the two different time points, and making a judgment as to a house change based on the variation,
   wherein at least one of the first object and the second object is the house object.

6. The non-transitory computer readable medium according to claim 5, wherein:
   the region-of-elevated-part extraction procedure comprises a normalization processing procedure of subtracting, from an altitude of the above-ground surface, an altitude of a ground surface excluding the feature to generate height data on the feature; and
   the region-of-elevated-part extraction procedure comprises determining the region of elevated part based on the height data on the feature.

7. The non-transitory computer readable medium according to claim 5, wherein the region-of-elevated-part extraction procedure comprises obtaining the region of elevated part through region segmentation using a watershed method.

8. The non-transitory computer readable medium according to claim 5, wherein the first object is a first house object and the second object is a second house object and the change judgment procedure comprises:
   an area comparing procedure of calculating areas of the first house object and the second house object based on the outline of each of the first house object and the second house object to judge whether or not the areas of the first house object and the second house object which are comparison targets are the same;
   an outline comparing procedure of judging whether or not the outline of each of the first house object and the second house object which are the comparison targets are the same;
   an average height comparing procedure of calculating average heights of the first house object and the second house object based on the three-dimensional information to judge whether or not the average heights of the first house object and the second house object which are the comparison targets are the same;
   a height histogram comparing procedure of obtaining height histograms of the first house object and the second house object based on the three-dimensional information to judge whether or not the height histograms of the first house object and the second house object which are the comparison targets are the same; and
   a judgment procedure of judging that there is no house change in a case where it is judged that there is no difference between the first house object and the second house object acquired at the two different time points in each of all the comparing procedures, and, on the other hand, judging that there is a house change in a case where it is judged that there is a difference in any one of the comparing procedures.

9. The house change judgment method according to claim 1, wherein the first object is the house object at a first time and the second object is the house object at a second time.

10. The house change judgment method according to claim 1, wherein the first object is the house object and the second object is a location of the house object but at a time where no house exists.

11. The house change judgment method according to claim 10, wherein the first object is acquired at a time before the second object is acquired.

12. The house change judgment method according to claim 10, wherein the first object is acquired at a time after the second object is acquired.

13. The non-transitory computer readable medium according to claim 5, wherein the first object is the house object at a first time and the second object is the house object at a second time.

14. The non-transitory computer readable medium according to claim 5, wherein the first object is the house object and the second object is a location of the house object but at a time where no house exists.

15. The non-transitory computer readable medium according to claim 14, wherein the first object is acquired at a time before the second object is acquired.

16. The non-transitory computer readable medium according to claim 14, wherein the first object is acquired at a time after the second object is acquired.

* * * * *